US010645081B2

(12) United States Patent
Ye et al.

(10) Patent No.: US 10,645,081 B2
(45) Date of Patent: May 5, 2020

(54) METHOD AND APPARATUS FOR AUTHENTICATING USER

(71) Applicant: BAIDU ONLINE NETWORK TECHNOLOGY (BEIJING) CO., LTD., Beijing (CN)

(72) Inventors: Can Ye, Beijing (CN); Wei Qi, Beijing (CN); Yiyu Peng, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 196 days.

(21) Appl. No.: 15/618,760

(22) Filed: Jun. 9, 2017

(65) Prior Publication Data

US 2018/0152445 A1 May 31, 2018

(30) Foreign Application Priority Data

Nov. 30, 2016 (CN) .......................... 2016 1 1077276

(51) Int. Cl.
| | |
|---|---|
| *H04L 9/00* | (2006.01) |
| *H04L 29/06* | (2006.01) |
| *G06F 21/32* | (2013.01) |
| *H04W 12/06* | (2009.01) |
| *G06Q 20/40* | (2012.01) |

(Continued)

(52) U.S. Cl.
CPC .......... *H04L 63/0861* (2013.01); *G06F 21/32* (2013.01); *G06Q 20/4014* (2013.01); *G06Q 20/40145* (2013.01); *G10L 17/14* (2013.01); *G10L 17/24* (2013.01); *H04L 63/101* (2013.01); *H04W 12/06* (2013.01); *G10L 17/08* (2013.01)

(58) Field of Classification Search
CPC .... H04L 63/101; H04L 63/0861; G06F 21/32
See application file for complete search history.

(56) References Cited

U.S. PATENT DOCUMENTS

2003/0182119 A1\* 9/2003 Junqua .................... G10L 15/24
704/246
2007/0219801 A1 9/2007 Sundaram
(Continued)

FOREIGN PATENT DOCUMENTS

| CN | 105656887 A | 6/2016 |
|---|---|---|
| CN | 106156583 A | 11/2016 |

(Continued)

*Primary Examiner* — Beemnet W Dada
(74) *Attorney, Agent, or Firm* — Lathrop GPM LLP

(57) ABSTRACT

The present disclosure discloses a method and an apparatus for authenticating a user. A specific embodiment of the method comprises: receiving an authentication request sent by a user terminal, wherein the authentication request comprises a user identification of a user of the user terminal and operation information related to user operation; determining whether the user operation matches a preset to-be-authenticated operation according to the user identification and the operation information; sending voicing material to the user terminal for reading by the user in response to determining that the user operation matches the preset to-be-authenticated operation, so that the user terminal acquires corresponding authentication voice of the user; receiving the authentication voice sent by the user terminal; and authenticating the user according to the user identification and the authentication voice.

25 Claims, 9 Drawing Sheets

(51) Int. Cl.
    *G10L 17/14*    (2013.01)
    *G10L 17/24*    (2013.01)
    *G10L 17/08*    (2013.01)

(56) References Cited

U.S. PATENT DOCUMENTS

2015/0178493 A1\* 6/2015 Liu .................. G06F 21/45
                                                                                       726/6
2016/0001412 A1    1/2016 Schoenefeld et al.

FOREIGN PATENT DOCUMENTS

| JP | 2002304379 A | 10/2002 |
|---|---|---|
| JP | 2003087860 A | 3/2003 |
| JP | 2003219038 A | 7/2003 |
| JP | 2009145402 A | 7/2009 |
| JP | 2013164472 A | 8/2013 |

\* cited by examiner

METHOD AND APPARATUS FOR AUTHENTICATING USER

CROSS-REFERENCE TO RELATED APPLICATION

This application claims the priority of Chinese Patent Application No. 201611077276.5, entitled "Method and Apparatus for Authenticating User," filed on Nov. 30, 2016, the content of which is incorporated herein by reference in its entirety.

TECHNICAL FIELD

The present disclosure relates to the field of computer technologies, particularly to the field of Internet technologies, and more particularly, to a method and an apparatus for authenticating a user.

BACKGROUND

With the rapid development of computer technologies, Internet technologies and mobile Internet technologies, a growing number of users use various client applications (for example, social apps, electronic shopping apps, electronic payment apps, Internet banking apps) installed on terminal devices (for example, smart mobile phones, tablet computers, personal computers, notebook computers) to obtain various services. To guarantee the safety of users' personal information and assets, user authentication is required for the majority of the client applications. At present, user authentication is carried out by entering an account number, a password and/or a verification code by the user for most apps.

However, many users' personal privacy data (for example, account numbers registered on various websites, passwords, names, mobile phone numbers, ID card numbers) may be illegally obtained and used by underground industries, causing great safety concerns.

SUMMARY

An objective of the present disclosure is to provide an improved method and an apparatus for authenticating a user, in order to solve the technical problem mentioned in the foregoing Background section.

In a first aspect, the present disclosure provides a method for authenticating a user. The method comprises: receiving an authentication request sent by a user terminal, wherein the authentication request comprises a user identification of a user of the user terminal and operation information related to user operation; determining whether the user operation matches a preset to-be-authenticated operation according to the user identification and the operation information; sending voicing material to the user terminal for reading by the user in response to determining that the user operation matches the preset to-be-authenticated operation, so that the user terminal acquires corresponding authentication voice of the user; receiving the authentication voice sent by the user terminal; and authenticating the user according to the user identification and the authentication voice.

In some embodiments, the authenticating the user according to the user identification and the authentication voice comprises: performing a voiceprint feature extraction on the authentication voice to generate an authentication voiceprint; and authenticating the user according to the user identification and the authentication voiceprint.

In some embodiments, the performing a voiceprint feature extraction on the authentication voice to generate an authentication voiceprint comprises: performing a character recognition on the authentication voice to obtain a character recognition result; determining whether the character recognition result matches a textual content corresponding to the voicing material; and performing a voiceprint feature extraction on the authentication voice to generate an authentication voiceprint in response to determining that the character recognition result matches a textual content corresponding to the voicing material.

In some embodiments, the authenticating the user according to the user identification and the authentication voice further comprises: performing a character recognition on the authentication voice to obtain a character recognition result; determining whether the character recognition result matches a textual content corresponding to the voicing material; and determining a failure in authenticating the user in response to determining that the character recognition result mismatches the textual content corresponding to the voicing material, and performing a first preset operation.

In some embodiments, the authenticating the user according to the user identification and the authentication voice comprises: searching a user voiceprint corresponding to the user identification in a preset user voiceprint set; and authenticating the user according to the user voiceprint and the authentication voiceprint.

In some embodiments, the searching a user voiceprint corresponding to the user identification in a preset user voiceprint set comprises: determining whether the authentication voiceprint matches a preset blacklist voiceprint; and searching a user voiceprint corresponding to the user identification in the preset user voiceprint set in response to determining that the authentication voiceprint does not match the preset blacklist voiceprint.

In some embodiments, the authenticating the user according to the user identification and the authentication voice comprises: determining whether the authentication voiceprint matches a preset blacklist voiceprint; and determining a failure in authenticating the user in response to determining that the authentication voiceprint matches the preset blacklist voiceprint, and performing a preset safety protection operation.

In some embodiments, the authenticating the user according to the user voiceprint and the authentication voiceprint comprises: calculating a similarity between the authentication voiceprint and the user voiceprint; determining whether the similarity is greater than a preset authentication threshold; and determining a success in authenticating the user in response to determining that the similarity is greater than the preset authentication threshold, and performing the user operation.

In some embodiments, the authenticating the user according to the user voiceprint and the authentication voice further comprises: determining a failure in authenticating the user in response to determining that the similarity is not greater than the preset authentication threshold, and performing a second preset operation.

In some embodiments, the determining a success in authenticating the user in response to determining that the similarity is greater than the preset authentication threshold, and performing the user operation comprise: determining whether the similarity is greater than a preset updated threshold, wherein the preset updated threshold is greater than the preset authentication threshold; and updating, with the authentication voiceprint, a user voiceprint corresponding to the user identification in the preset user voiceprint set in response to determining that the similarity is greater than the preset updated threshold.

In some embodiments, the method further comprises: performing the user operation in response to determining that the user operation does not match the preset to-be-authenticated operation.

In some embodiments, the voicing material comprises at least one of: text information, sound information and image information.

In a second aspect, the present disclosure provides an apparatus for authenticating a user. The apparatus comprises: a request receiving unit, configured to receive an authentication request sent by a user terminal, the authentication request comprising a user identification of a user of the user terminal and operation information related to user operation; a determining unit, configured to determine whether the user operation matches a preset to-be-authenticated operation according to the user identification and the operation information; a sending unit, configured to send voicing material to the user terminal for reading by the user in response to the determining unit determining that the user operation matches the preset to-be-authenticated operation, so that the user terminal acquires corresponding authentication voice of the user; an authentication voice receiving unit, configured to receive the authentication voice sent by the user terminal; and an authenticating unit, configured to authenticate the user according to the user identification and the authentication voice.

In some embodiments, the authenticating unit comprises: a generating subunit, configured to perform a voiceprint feature extraction on the authentication voice to generate an authentication voiceprint; and an authenticating subunit, configured to authenticate the user according to the user identification and the authentication voiceprint.

In some embodiments, the generating subunit comprises: a voice recognition module, configured to perform a character recognition on the authentication voice to obtain a character recognition result; a first determining module, configured to determine whether the character recognition result matches a textual content corresponding to the voicing material; and a generating module, configured to perform a voiceprint feature extraction on the authentication voice to generate an authentication voiceprint in response to the first determining module determining that the character recognition result matches a textual content corresponding to the voicing material.

In some embodiments, the authenticating unit further comprises: a voice recognition subunit, configured to perform a character recognition on the authentication voice to obtain a character recognition result; a determining subunit, configured to determine whether the character recognition result matches a textual content corresponding to the voicing material; and a performing subunit, configured to determine a failure in authenticating the user in response to the determining subunit determining that the character recognition result mismatches the textual content corresponding to the voicing material, and perform a first preset operation.

In some embodiments, the authenticating subunit comprises: a searching module, configured to search a user voiceprint corresponding to the user identification in a preset user voiceprint set; and an authenticating module, configured to authenticate the user according to the user voiceprint and the authentication voiceprint.

In some embodiments, the searching module comprises: a first determining submodule, configured to determine whether the authentication voiceprint matches a preset blacklist voiceprint; and a searching submodule, configured to search a user voiceprint corresponding to the user identification in the preset user voiceprint set in response to the first determining submodule determining that the authentication voiceprint does not match the preset blacklist voiceprint.

In some embodiments, the authenticating subunit comprises: a second determining module, configured to determine whether the authentication voiceprint matches a preset blacklist voiceprint; and a performing module, configured to determine a failure in authenticating the user in response to the second determining module determining that the authentication voiceprint matches the preset blacklist voiceprint, and perform a preset safety protection operation.

In some embodiments, the authenticating module comprises: a calculating submodule, configured to calculate a similarity between the authentication voiceprint and the user voiceprint; a second determining submodule, configured to determine whether the similarity is greater than a preset authentication threshold; and a first performing submodule, configured to determine a success in authenticating the user in response to the second determining submodule determining that the similarity is greater than the preset authentication threshold, and perform the user operation.

In some embodiments, the authenticating module further comprises: a second performing submodule, configured to determine a failure in authenticating the user in response to the second determining submodule determining that the similarity is not greater than the preset authentication threshold, and perform a second preset operation.

In some embodiments, the first performing submodule is further configured to: determine whether the similarity is greater than a preset updated threshold, the preset updated threshold being greater than the preset authentication threshold; and update, with the authentication voiceprint, a user voiceprint corresponding to the user identification in the preset user voiceprint set in response to determining that the similarity is greater than the preset updated threshold.

In some embodiments, the apparatus further comprises: a performing unit, configured to perform the user operation in response to the determining unit determining that the user operation does not match the preset to-be-authenticated operation.

In some embodiments, the voicing material comprises at least one of followings: text information, sound information and image information.

According to the method and the apparatus for authenticating a user provided by the present disclosure, an authentication request sent by a user terminal is received, wherein the authentication request comprises a user identification of a user of the user terminal and operation information related to user operation. Next, it is determined whether the user operation matches a preset to-be-authenticated operation according to the user identification and the operation information. Next, voicing material is sent to the user terminal for reading by the user in response to determining that the user operation matches the preset to-be-authenticated operation, so that the user terminal acquires corresponding authentication voice of the user. Afterwards, the authentication voice sent by the user terminal is received. Finally, the user is authenticated according to the user identification and the authentication voice. In this way, voiceprint authentication of the user in case that the user operation matches the preset to-be-authenticated operation is implemented, efficiency in authenticating the user is enhanced, and security of accessing the server by the user terminal is enhanced.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
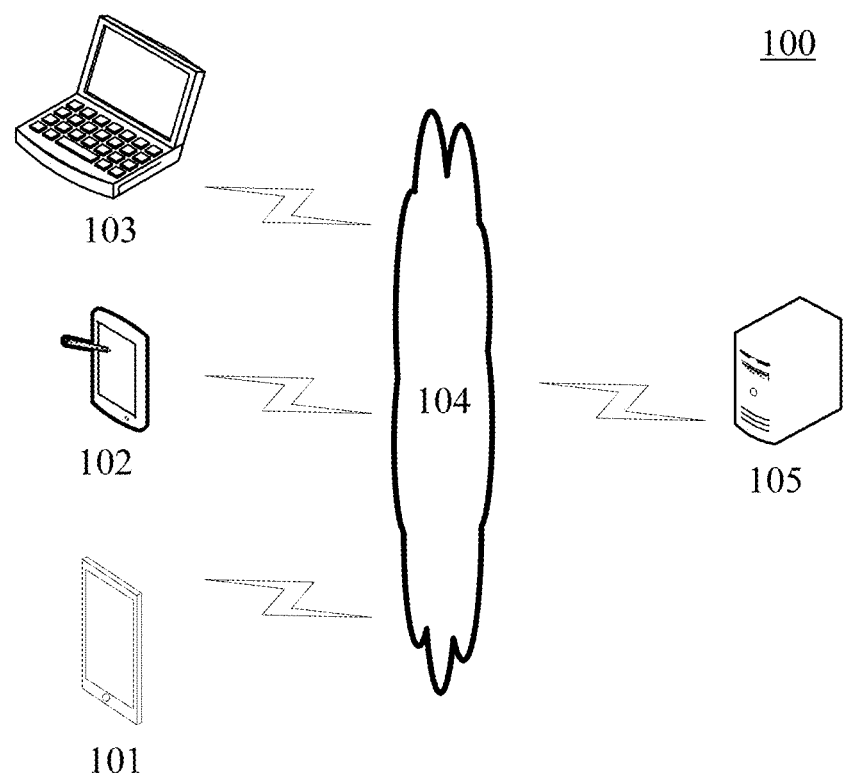
FIG. 1 is an architectural diagram of an exemplary system in which the present application may be implemented.

FIG. 1 shows an exemplary architecture of a system 100 which may be used by a user authenticating method or a user authenticating apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various client applications, such as user authentication applications, voice collection applications, voice broadcast applications, shopping applications, search applications, electronic payment applications, online banking applications, search applications, instant messaging tools, mailbox clients, and social platform software may be installed on the terminal devices 101, 102 and 103.

The terminal devices 101, 102 and 103 may be various electronic devices having a display screen and voice sampling devices (for example, a microphone), including but not limited to, smart phones, tablet computers, laptop computers and desktop computers.

The server 105 may be a server providing various services, for example, a backend server supporting the user authenticating applications installed on the terminal devices 101, 102 and 103. The backend server may provide processing such as analysis on received authentication requests, and return the processing results (for example, voice material) to the terminal devices.

It should be noted that the object data updating method according to the embodiments of the present application is generally executed by the server 105. Accordingly, an object data updating apparatus is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
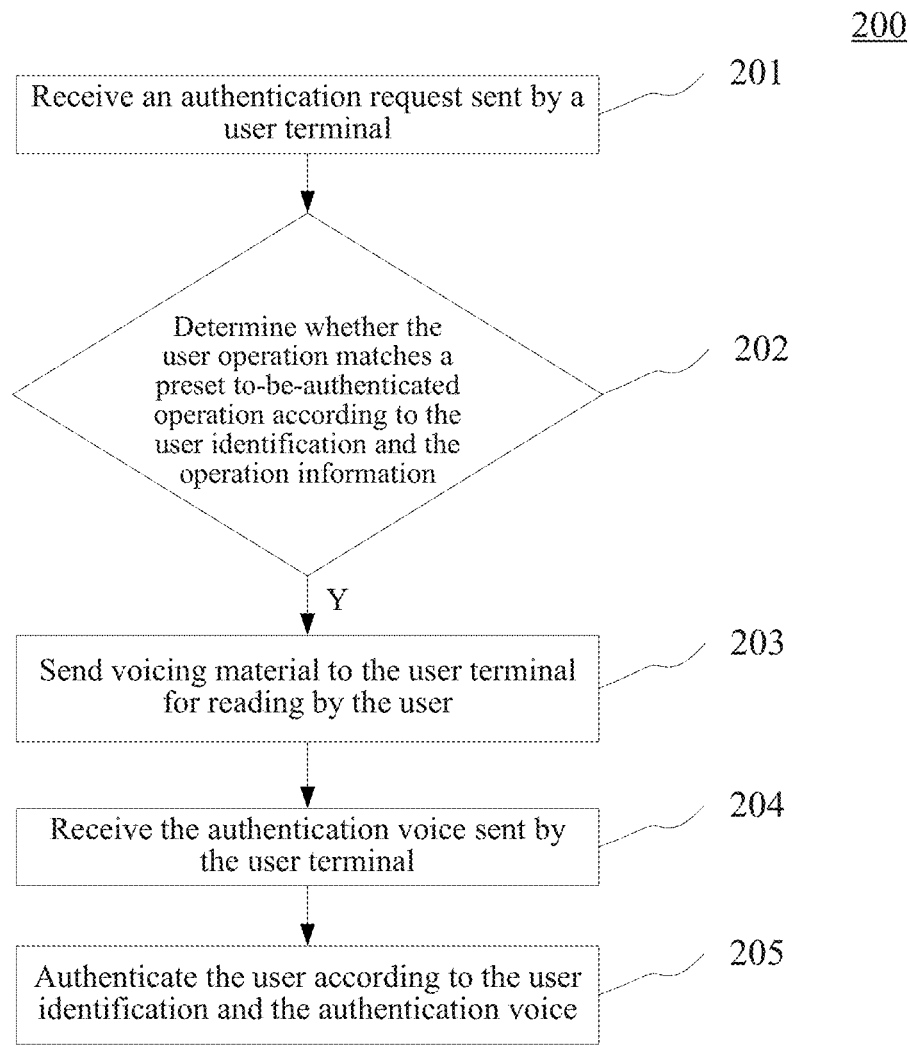
FIG. 2 is a flowchart of a method for authenticating a user according to an embodiment of the present disclosure.

Continuing referring to FIG. 2, a flow 200 in a method for authenticating a user according to an embodiment the present disclosure is shown. The method for authenticating a user comprises:

Step 201: receiving an authentication request sent by a user terminal.

In this embodiment, an electronic device (for example, the server as shown in FIG. 1) on which the method for authenticating a user runs may receive an authentication request from the user terminal (for example, the terminal devices 101, 102 and 103 as shown in FIG. 1) by way of wired connection or wireless connection. The authentication request comprises a user identification of the user of the user terminal and operation information related to user operation.

In this embodiment, the user identification of the user of the user terminal is an identification differentiating each user. The user identification may be data in various forms. For example, the user identification may be a digit or a character string.

In this embodiment, the user causes an application running on the user terminal to perform an operation corresponding to a user action by performing various actions (for example, keyboard input, mouse click, touch screen click and touch screen input) on the user terminal. Here, the operation performed by the application running on the terminal is the user operation. As an example, when the user clicks a product link in an electronic shopping app, the electronic shopping app running on the terminal receives a click action by the user and performs a product page browsing operation. The user operation is the product page browsing operation. When the user clicks the control that can trigger an "Add to Cart" operation in an electronic shopping app or on a website, the electronic shopping app running on the terminal performs the "Add to Cart" operation. The user operation is the adding to cart operation.

In this embodiment, operation information related to the user operation may comprise at least one of: time information, site information, operation type information, operation object information and operation numerical information which are related to the user operation.

As an example, the time information related to the user operation may be time when the user operation occurs. The site information related to the user operation may be a geographical position where the user terminal is. The operation type information related to the user operation may be an operation type to which the user operation belongs. The operation object information related to the user operation may be information of an object directed by the user operation. The operation numerical information related to the user operation may be a numerical value involved in the user operation.

It should be noted that the above wireless connection manner may comprise but not limited to 3G/4G connection, WiFi connection, Bluetooth connection, WiMAX connection, Zigbee connection, ultra wideband (UWB) connection and other presently known or future developed wireless connections.

Step 202: determining whether the user operation matches a preset to-be-authenticated operation according to the user identification and the operation information, and going to Step 203 if the determination result is yes.

In this embodiment, based on the authentication request received in Step 201, the electronic device (for example, the server as shown in FIG. 1) may first acquire the user identification and the operation information in the authentication request, and then determine whether the user operation matches the preset to-be-authenticated operation according to the user identification and the operation information.

In this embodiment, the preset to-be-authenticated operation may comprise at least one of: a preset forbidden operation time range, a preset forbidden operation site range, a preset forbidden operation type, and a forbidden operation numerical range corresponding to the preset forbidden operation type.

In this embodiment, the same preset to-be-authenticated operation may be adopted for all users, or different preset to-be-authenticated operations may be set for different users. When different preset to-be-authenticated operations are set for different users, the electronic device may first query the preset to-be-authenticated operation corresponding to the user identification. Afterward, it is determined whether the user operation matches the preset to-be-authenticated operation searched out according to the user identification and the operation information.

In some optional implementations of this embodiment, the operation information related to the user operation may comprise operation time of the user operation, and the preset to-be-authenticated operation may further comprise the preset forbidden operation time range. As thus, the electronic device may first determine whether the operation time of the user operation is within the preset forbidden operation time range. When the operation time of the user operation is within the preset forbidden operation time range, the electronic device determines that the user operation matches the preset to-be-authenticated operation, and goes to Step 203. Otherwise, when the operation time of the user operation is not within the preset forbidden operation time range, the electronic device determines that the user operation does not match the preset to-be-authenticated operation. Here, the preset forbidden operation time range of the user may be set for the user. When setting the preset forbidden operation time range of the user, the preset forbidden operation time range of the user may be generated by collecting statistics on historical operation time of the user, or a user-defined interface may be provided to receive the preset forbidden operation time range manually set by the user.

In some optional implementations of this embodiment, the operation information related to the user operation may further comprise an operation site of the user operation, and the preset to-be-authenticated operation may further comprise the preset forbidden operation site range. As an example, the operation site of the user operation may be a geographical position where the user terminal is. As thus, the electronic device may first determine whether the operation site of the user operation is within the preset forbidden operation site range. When the operation site of the user operation is within the preset forbidden operation site range, the electronic device determines that the user operation matches the preset to-be-authenticated operation, and goes to Step 203. Otherwise, when the operation site of the user operation is not within the preset forbidden operation site range, the electronic device determines that the user operation does not match the preset to-be-authenticated operation. Here, the preset forbidden operation site range of the user may be set for the user. When setting the preset forbidden operation site range of the user, the preset forbidden operation site range of the user may be generated by collecting statistics on historical operation sites of the user, or a user-defined interface may be provided to receive the preset forbidden operation site range manually set by the user.

In some optional implementations of this embodiment, the operation information related to the user operation may further comprise an operation type of the user operation, and the preset to-be-authenticated operation may further comprise the preset forbidden operation type. As an example, the operation type may comprise a product page browsing operation, an "Add to Cart" operation and a payment operation in electronic shopping apps.

As thus, the electronic device may first determine whether the operation type of the user operation matches the preset forbidden operation type. When the operation type of the user operation matches the preset forbidden operation type, the electronic device determines that the user operation matches the preset to-be-authenticated operation, and goes to Step 203. Otherwise, when the operation type of the user operation does not match the preset forbidden operation type, the electronic device determines that the user operation does not match the preset to-be-authenticated operation. Here, some operation types (for example, payment operation and transfer operation) that may cause a loss to the user may be set by default as the preset forbidden operation type, or a user-defined interface may be provided to receive the preset forbidden operation type manually set by the user.

In some optional implementations of this embodiment, the operation information related to the user operation may further comprise the operation type of the user operation and a corresponding operation numerical value, and the preset to-be-authenticated operation may further comprise the preset forbidden operation type and a corresponding forbidden operation numerical range. For example, the operation information may comprise a payment type operation and an operation numerical value (for example, payment amount) of the payment type operation. As thus, the electronic device may first determine whether the operation type of the user operation matches the preset forbidden operation type. When the operation type of the user operation matches the preset forbidden operation type, the electronic device may acquire a forbidden operation numerical range, corresponding to the operation type of the user operation, in the preset to-be-authenticated operation, and determine whether the operation numerical value corresponding to the user operation is within the forbidden operation numerical range. When the operation numerical value corresponding to the user operation is within the forbidden operation numerical range, the electronic device determines that the user operation matches the preset to-be-authenticated operation, and goes to Step 203. Otherwise, when the operation numerical value corresponding to the user operation is not within the forbidden operation numerical range, the electronic device determines that the user operation does not match the preset to-be-authenticated operation. Here, different forbidden operation types and corresponding forbidden operation numerical ranges that are set by default for all users may be used, or a user-defined interface may be provided to receive the forbidden operation type and corresponding forbidden operation numerical range manually set by the user.

Step 203: sending voicing material to the user terminal for reading by the user, so that the user terminal acquires corresponding authentication voice of the user.

In this embodiment, the electronic device (for example, the server as shown in FIG. 1) may send voicing material to the user terminal (for example, the terminal devices 101, 102 and 103 as shown in FIG. 1) for reading by the user in the case of determining, in Step 202, that the user operation matches the preset to-be-authenticated operation, so that the user terminal acquires corresponding authentication voice of the user.

In some optional implementations of this embodiment, the voicing material may be text information, that is, the electronic device may send text voicing material to the user terminal. After receiving the text voicing material, the user terminal may present the text voicing material to the user, and collect, by means of a sound collecting device (for example, a microphone), authentication voice obtained by reading, by the user, the textual content in the text voicing material.

In some optional implementations of this embodiment, the voicing material also may be image information, that is, the electronic device may send image voicing material to the user terminal. After receiving the image voicing material, the user terminal may present the image voicing material to the user, and collect, by means of a sound collecting device (for example, a microphone), authentication voice obtained by reading, by the user, the textual content displayed in the image voicing material.

In some optional implementations of this embodiment, the voicing material also may be sound information, that is, the electronic device may send sound voicing material to the user terminal. After receiving the sound voicing material, the user terminal may play the sound voicing material for the user by using a sound playback device (for example, a speaker), and collect, by means of a sound collecting device (for example, a microphone), authentication voice obtained by reading, by the user, the textual content played in the sound voicing material.

In some optional implementations of this embodiment, the voicing material also may be combined information of at least one of text information, image information or sound information.

In this embodiment, the voicing material corresponds to corresponding textual content.

In some optional implementations of this embodiment, the electronic device may use fixed textual content as the textual content corresponding to the voicing material, for example, "123456" is used as the textual content corresponding to the voicing material.

In some optional implementations of this embodiment, the electronic device also may randomly select a part of texts from a preset text set to constitute the textual content corresponding to the voicing material. The textual content corresponding to the voicing material constituted by the part of texts selected randomly is not fixed each time, which increases a difficulty of an illegal user in simulating the user for voiceprint authentication, and thus the security in the process of voiceprint authentication of the user may be enhanced.

In some optional implementations of this embodiment, the textual content corresponding to the voicing material may be a combination of digits, or may be a combination of English letters, or may be a combination of Chinese characters, or may be a combination of at least two types of the digits, the English letters or the Chinese characters.

In some optional implementations of this embodiment, to obtain a better voiceprint authentication effect, the textual content corresponding to the voicing material should be related to the textual content corresponding to the voicing material during a voiceprint registration. Specifically, characters comprised in the textual content corresponding to the voicing material sent to the user terminal in the voiceprint authentication and characters comprised in the textual content corresponding to the voicing material sent to the user terminal in the voiceprint registration shall be from the same character set. For example, the character set may be ten digits "0-9", or the character set may be 26 English letters "A-Z."

In some optional implementations of this embodiment, to better reflect the voiceprint feature of the user and obtain a better voiceprint authentication effect, the number of characters comprised in the textual content corresponding to the voicing material should be greater than a preset number of characters, for example, greater than six characters.

In some optional implementations of this embodiment, to better reflect the voiceprint feature of the user and obtain a better voiceprint authentication effect, the electronic device may send preset pieces (for example, three pieces) of voicing material to the user terminal. Thus, the user terminal may receive the preset pieces of voicing material, present the preset pieces of voicing material to the user, and acquire the preset number of authentication voice obtained by respectively reading, by the user, the textual content in each piece of voicing material among the preset pieces of voicing material.

In some optional implementations of this embodiment, the textual content corresponding to the voicing material may be the textual content itself or may use definitional parts to encrypt characters, for example, replacing a part of plain texts with special symbols (for example, replacing 3 with #, when the voicing material presented to the user displays "#", the user needs to read the "#" as "3"). In this way, the difficulty of an illegal user simulating the identity of the user of the user terminal for voiceprint authentication may be increased.

Step 204: receiving the authentication voice sent by the user terminal.

In this embodiment, after the electronic device (for example, the server as shown in FIG. 1) sends the voicing material for reading by the user to the user terminal (for example, the terminal devices 101, 102 and 103 as shown in FIG. 1), the user terminal may use a sound collecting device (for example, a microphone) to collect the authentication voice of the user, wherein the authentication voice is the voice of the user reading in accordance with the voicing material presented to the user terminal. Thus, the electronic device may receive the authentication voice of the user sent by the user terminal.

Step 205: authenticating the user according to the user identification and the authentication voice.

In this embodiment, after receiving the authentication voice, the electronic device (for example, the server as shown in FIG. 1) may authenticate the user according to the user identification and the authentication voice.

In some optional implementations of this embodiment, after receiving the authentication voice, the electronic device may first perform a voiceprint feature extraction on the authentication voice to generate an authentication voiceprint. Afterward, the electronic device searches, in a preset user voiceprint set, a user voiceprint corresponding to the user identification. Further, the electronic device determines whether the authentication voiceprint matches the user voiceprint. When the authentication voiceprint matches the user voiceprint, the electronic device determines that the user authentication is succeeded and performs the user operation. When the authentication voiceprint does not match the user voiceprint, the electronic device determines that the user authentication is failed.

It is to be noted that performing a voiceprint feature extraction on the authentication voice is a presently widely studied and used existing technique, and is not described here. Those skilled in the art may appreciate that how to perform a voiceprint feature extraction on the authentication voice in the voiceprint authentication stage is related to the feature extraction process of a registered voiceprint in the voiceprint registration stage.

For example, performing a voiceprint feature extraction on the authentication voice may be implemented by extracting typical features in the authentication voice. Specifically, features such as wavelength, frequency, intensity and rhythm of a voice sound may represent sound characteristics of the user. Therefore, when a voiceprint feature extraction is performed on the authentication voice, the features such as wavelength, frequency, intensity and rhythm of the authentication voice may be extracted, feature values of the features such as wavelength, frequency, intensity and rhythm of the authentication voice may be determined, and the feature values of the features such as wavelength, frequency, intensity and rhythm of the authentication voice may be used as the authentication voiceprint.

For example, performing a voiceprint feature extraction on the authentication voice also may be implemented by extracting acoustic features in the authentication voice, for example, Mel-Frequency Cepstral Coefficient. The process of extracting the Mel-Frequency Cepstral Coefficient for the authentication voice may comprise pre-weighting, framing, windowing, fast Fourier transform, Mel-filtering, logarithmic transformation and discrete cosine transform.

In some optional implementations of this embodiment, the preset user voiceprint set may be locally stored in the electronic device, so that the electronic device may first acquire the preset user voiceprint set locally, and then search the user voiceprint corresponding to the user identification from the preset user voiceprint set.

In some optional implementations of this embodiment, the preset user voiceprint set also may be stored in other electronic devices (for example, a user voiceprint server for storing the user voiceprint) in network connection to the electronic device. As thus, the electronic device may first remotely acquire the preset user voiceprint set, and then search the user voiceprint corresponding to the user identification from the preset user voiceprint set. Of course, the electronic device may also remotely send a query request for querying the user voiceprint to other electronic devices storing the preset user voiceprint set, here, the query request comprises the user identification. As thus, after receiving the query request, the other electronic devices may query the user voiceprint corresponding to the user identification from the preset user voiceprint set, and returns the user voiceprint to the electronic device, which receives the user voiceprint returned by the other electronic devices.

In some optional implementations of this embodiment, the user voiceprint corresponding to the user identification in the preset user voiceprint set may be generated through the following Step a to Step e (not shown).

Step a: receiving a voiceprint registration request sent by the user terminal.

In this embodiment, the voiceprint registration request may comprise the user identification of the user of the user terminal and image information with a face image of the user and an identity card image of the user. The identity card is an ID for authenticating the legal identity of the user. The image information with the face image of the user and the identity card image of the user may be obtained by collecting an image of the user holding the identity card in hand, including the face of the user.

Step b: authenticating the user information of the user according to the user identification and the image information.

In an implementation of the embodiments of the application, Step b may comprise the following substeps.

Step b1: acquiring registration information corresponding to the user identification, the registration information comprising name, gender and identity card identification.

Step b2: recognizing the face image and the identity card image in the image information.

Step b3: recognizing the name, the gender and the identity card identification in the identity card image.

Step b4: determining whether the name, the gender and the identity card identification in the registration information are respectively the same as the name, the gender and the identity card identification obtained for recognizing the identity card image, and going to Step b5 if they are the same, or going to Step b5' if they are different.

Step b5': determining that the user information authentication of the user is failed, and ending Step b.

Step b5: recognizing the face image of the identity card image and determining whether the face image of the identity card image matches the face image of the image information, going to Step b6 if they match, or going to Step b5' if they do not match.

Step b6: determining that the user information authentication of the user is succeeded, and ending Step b.

Step c: determining whether the user information authentication of the user is succeeded, going to Step d if it is succeeded, otherwise, ending Step c.

Step d: sending the voicing material to the user terminal for reading by the user, so that the user terminal acquires corresponding registered voice of the user.

Step e: receiving the registered voice sent by the user terminal.

Step f: performing a voiceprint feature extraction on the registered voice to generate the user voiceprint corresponding to the user identification in the preset user set.

The method for generating the user voiceprint corresponding to the user identification in the preset user voiceprint set from Step a to Step e may ensure the legality of the user by authenticating the user information, then acquiring the registered voice of the user and extracting the voiceprint.

In some optional implementations of this embodiment, the electronic device may determine whether the authentication voice matches the user voiceprint through the following steps: first, the electronic device may calculate a similarity between the authentication voiceprint and the user voiceprint, and then determine whether the similarity is greater than a preset authentication threshold, determine that the authentication voiceprint matches the user voiceprint when the similarity is greater than the preset authentication threshold, or determine that the authentication voiceprint does not match the user voiceprint when the similarity is not greater than the preset authentication threshold.

In some optional implementations of this embodiment, the electronic device may calculate the similarity between the authentication voiceprint and the user voiceprint using distance measurement. The distance measurement is used for measuring the distance between the authentication voiceprint and the user voiceprint. The farther the distance is, the smaller the similarity is; and the nearer the distance is, the larger the similarity is. Here, the distance measurement includes but is not limited to: Euclidean distance, Minkowski distance, Manhattan distance, Chebyshev distance and Mahalanobis distance, etc.

In some optional implementations of this embodiment, the electronic device also may calculate the similarity between the authentication voiceprint and the user voiceprint using similarity measurement. The similarity measurement is used for calculating the degree of similarity between the authentication voiceprint and the user voiceprint. Contrary to the distance measurement, the smaller a value of similarity measurement is, the smaller the similarity between the authentication voiceprint and the user voiceprint is, accordingly the larger is the difference. Here, the similarity measurement includes but is not limited to: cosine similarity, Pearson correlation coefficient, Jaccard coefficient, and adjusted cosine similarity.

It is to be noted that the method for calculating the similarity using the distance measurement and the similarity measurement is a conventional technique presently extensively studied and used, and is not repeatedly described here.

As an example, dimensionalities included in the characteristics of the authentication voiceprint, characteristic value in each of the dimensionalities and weight of each of the dimensionalities may be combined to implement the calculation of the similarity between the authentication voiceprint and the user voiceprint, specifically including but not limited to: determining the characteristic value of each dimensionality of the authentication voiceprint and the characteristic value of each dimensionality of the user voiceprint, and determining the weight of each dimensionality; and calculating a similarity value between the authentication voiceprint and the user voiceprint according to the characteristic value of each of the dimensionalities of the authentication voiceprint, the characteristic value of each of the dimensionalities of the user voiceprint and the weight of each of the dimensionalities.

For example, when both the authentication voiceprint and the user voiceprint comprises n dimensionalities, wherein the n is a natural number, the similarity between the authentication voiceprint and the user voiceprint may be calculated according to the following formula:

$$S = S_{max} - \sum_{i=1}^{n} H_i \times |V_1[i] - V_2[i]|$$

S is the similarity between the authentication voiceprint and the user voiceprint; $S_{max}$ is a preset maximum similarity value (for example, 100) greater than 0; i is a natural number from 1 to n; $V_1[i]$ is a value of the authentication voiceprint $V_1$ at the dimensionality i; $V_2[i]$ is the value of the user voiceprint $V_2$ at the dimensionality i; $H_i$ is the weight of the dimensionality when calculating the similarity between the authentication voiceprint $V_1$ and the user voiceprint $V_2$, wherein $$i \sum_{i=1}^{n} H_i = 1.$$

It can be observed from the above formula that the closer the characteristic value between the authentication voiceprint and the user voiceprint is, the larger the similarity between the authentication voiceprint and the user voiceprint is.

In some optional implementations of this embodiment, after determining that the user authentication is failed, the electronic device may send new voicing material different from the current voicing material to the user terminal, so that the user reads again the textual content in the new voicing material, receives again authentication voice sent by the user terminal, and authenticates again the user according to the user identification and the received authentication voice until a specified number of authentications (for example three authentications) is reached.

In some optional implementations of this embodiment, after determining that the user authentication is failed, the electronic device may also send, a prompt message to the user terminal, indicating the user to read again the textual content in the current voicing material, so that the user reads again the textual content in the voicing material sent to the user terminal in Step 203, receives again authentication voice sent by the user terminal, and authenticates again the user according to the user identification and the received authentication voice until a specified number of authentications (e.g. three times) is reached.

In some optional implementations of this embodiment, the electronic device also may perform the user operation in the event that it is determined in Step 202 that the user operation does not match the preset to-be-authenticated operation.

Figure 3A:
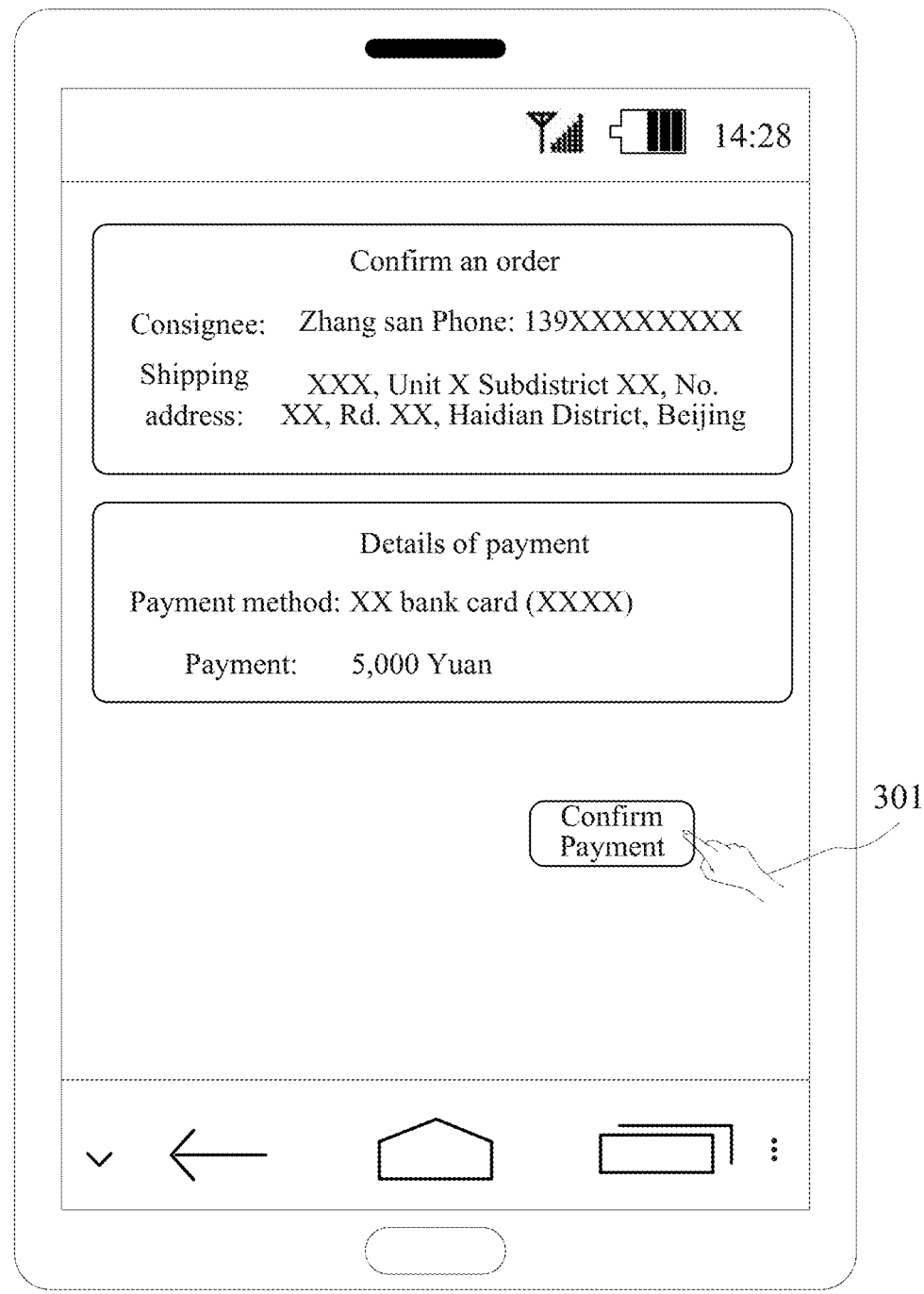
FIG. 3a-FIG. 3d are schematic diagrams of the method for authenticating a user according to an application scenario of the present disclosure.
Figure 3B:
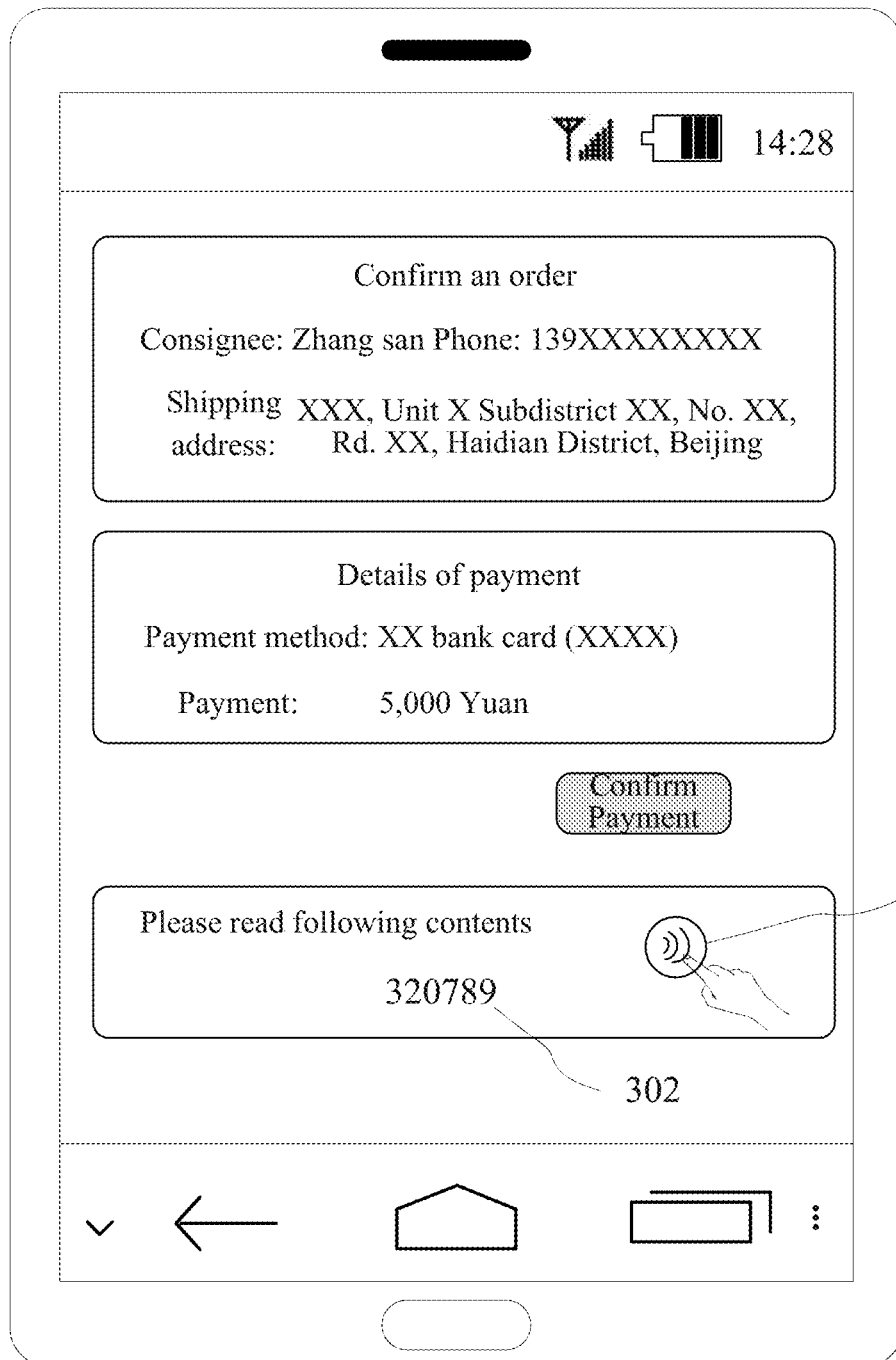
Figure 3C:
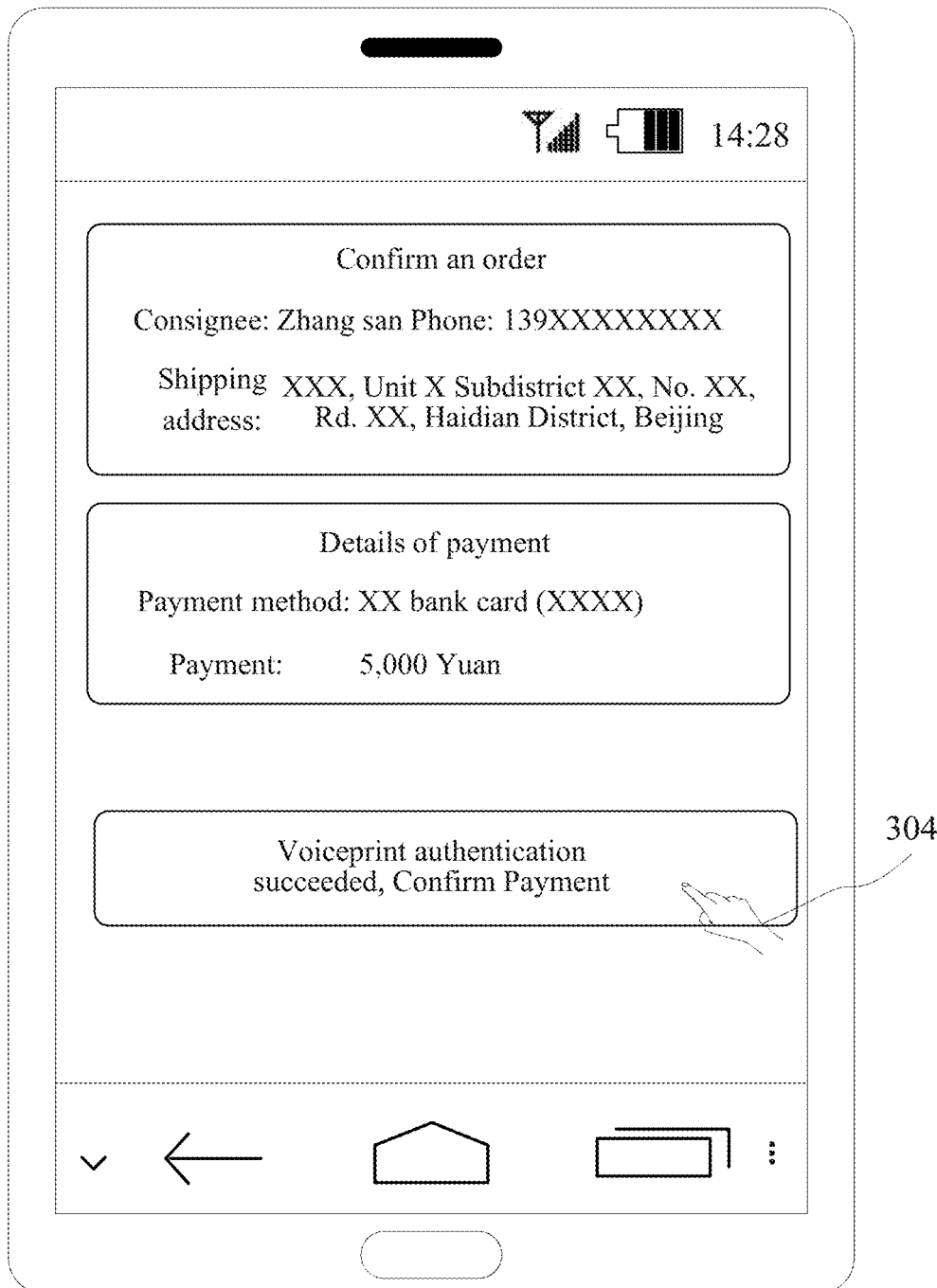
Figure 3D:
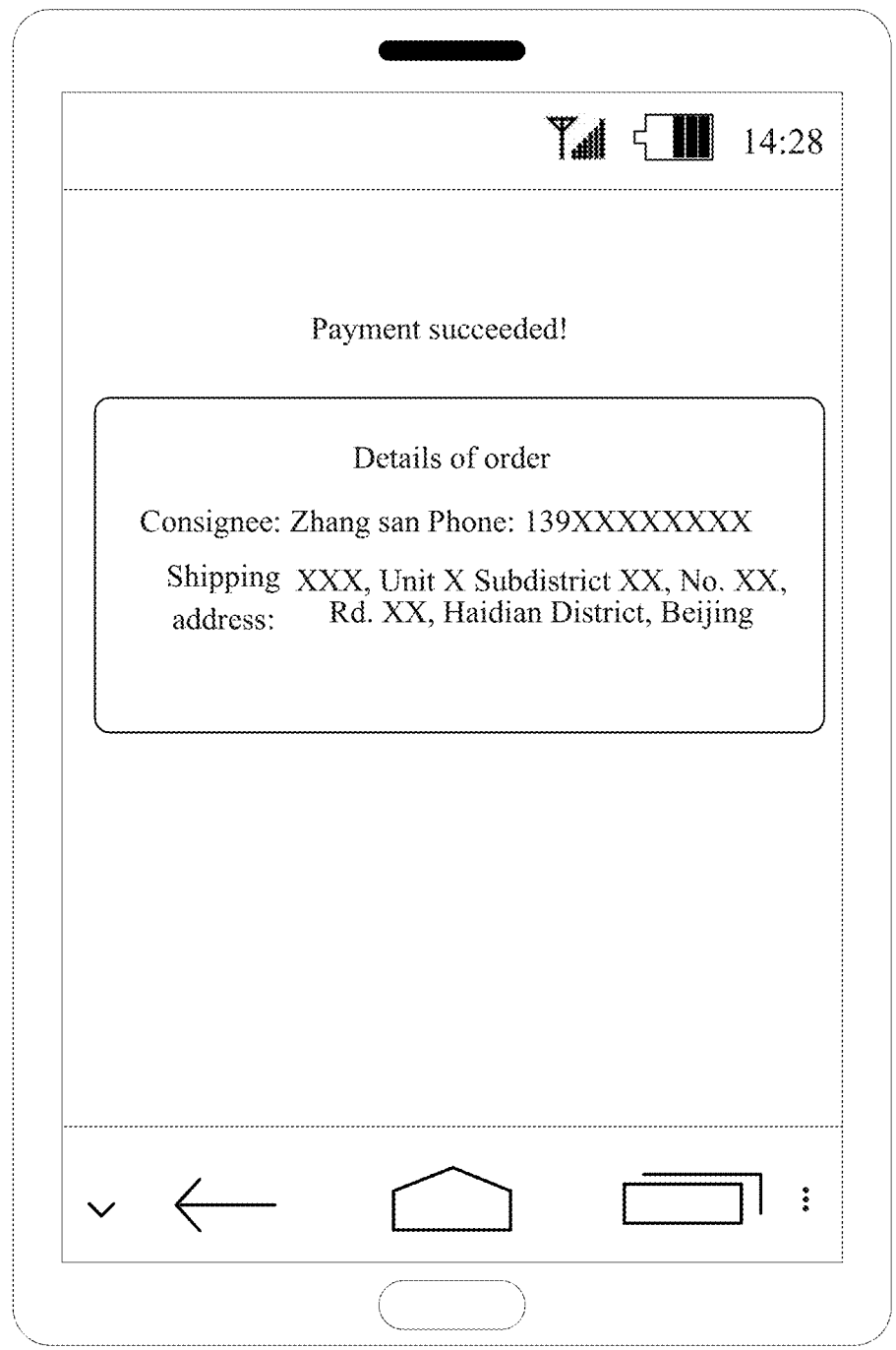

Continuing referring to FIGS. 3a to 3D, which are schematic diagrams of the method for authenticating a user according to an application scenario of the present disclosure. In the application scenario of FIG. 3a, the user uses the terminal to perform a "payment" operation with an amount of "5,000" yuan (as shown by numeral 301 in FIG. 3). Subsequently, the terminal sends an authentication request to a server through the backend, and then the server may acquire the authentication request from the backend, and match the "payment" operation with an amount of "5,000" yuan with the preset to-be-authenticated user operation. The preset to-be-authenticated user operation includes forbidden "payment" operation type and corresponding forbidden operation numerical range of ">=100" yuan. As thus, the "payment" operation with an amount of "5,000" yuan performed by the user matches the preset to-be-authenticated user operation. Therefore, the voicing material sent by the server to the user terminal is "320789." The user terminal receives the voicing material and displays the voicing material to the user (as shown by numeral 302 in FIG. 3b). Afterward, the user clicks a sound icon as shown by numeral 303 in FIG. 3b to start reading the voicing material "320789," and releases the sound icon as shown by numeral 303 in FIG. 3b after reading. Afterwards, the user terminal acquires the authentication voice read by the user according to the voicing material, and sends the authentication voice to the server. Finally, the server receives the authentication voice, and authenticates the user according to the user identification of the user and the authentication voice. The result shows that the authentication is succeeded, and the server sends a message indicating a successful authentication to the user terminal. After receiving the message indicating a successful authentication, as shown by numeral 304 in FIG. 3c, the user terminal indicates that the voiceprint authentication of the user is successful and may carry out the operation of "Confirm Payment." The user clicks the button as shown by numeral 304 in FIG. 3c to perform the operation of "Confirm Payment" with the amount of "5,000" yuan. FIG. 3d shows an interface after the successful payment.

According to the method provided by the embodiment of the present disclosure, after the authentication request of the user terminal is received, the user operation is matched with the preset to-be-authenticated operation, and a further voiceprint authentication is performed on the user in the case of a successful matching. In this way, the security of the user terminal accessing the server is enhanced, and the security of the personal information and assets of the user is guaranteed.

Figure 4:
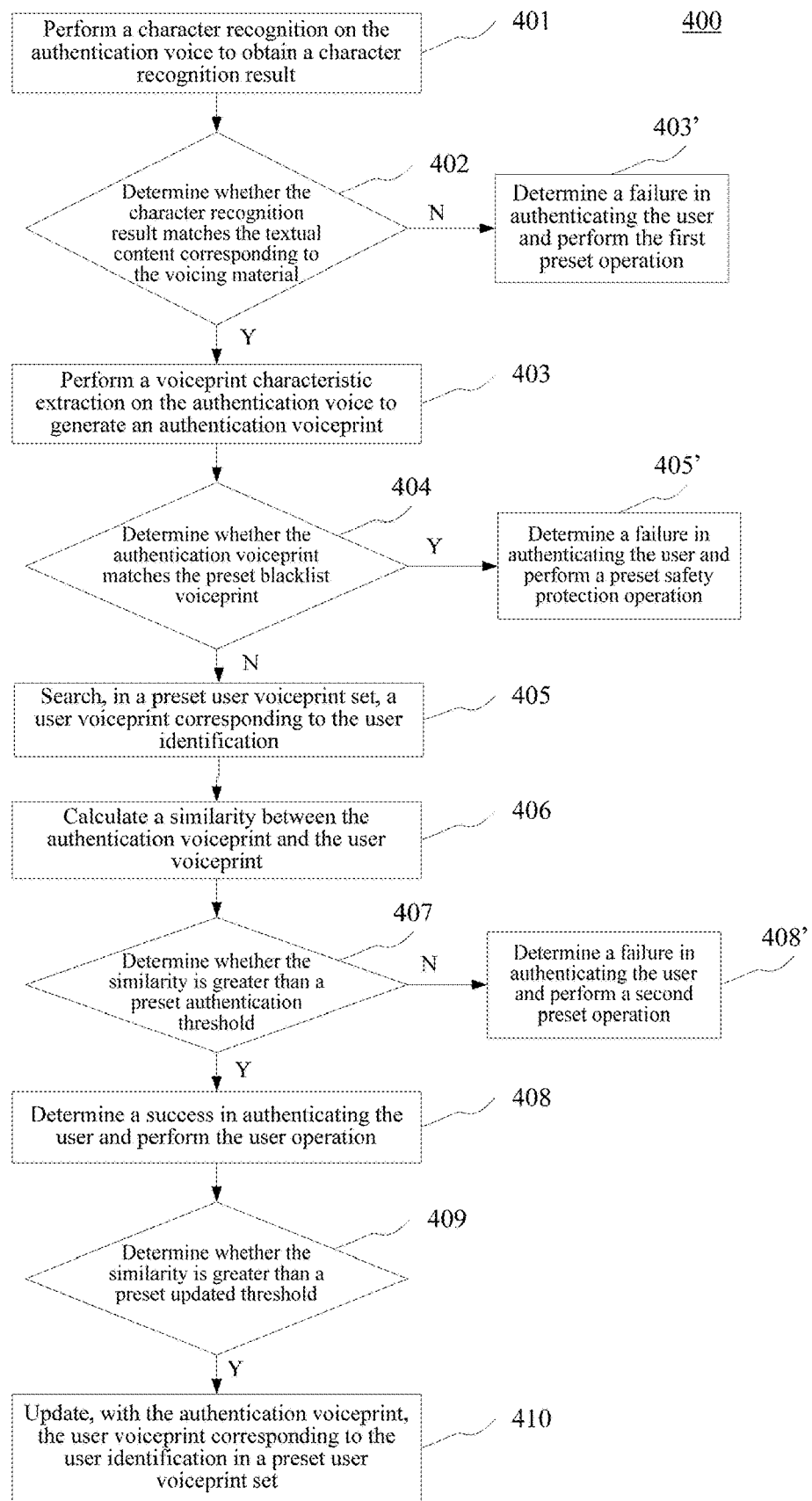
FIG. 4 is a flowchart of a step of authenticating a user according to a user identification and an authentication voice in the method for authenticating a user according to another embodiment of the present disclosure.

Further referring to FIG. 4, illustrating a flowchart 400 of steps in authenticating a user according to the user identification and the authentication voice in the method for authenticating a user according to another embodiment of the present disclosure. The flowchart 400 comprises the following steps.

Step 401: performing a character recognition on the authentication voice to obtain a character recognition result.

In this embodiment, the electronic device may first perform a character recognition on the authentication voice received from the user terminal to obtain the character recognition result.

It is to be noted that how to perform a character recognition on the voice is a conventional technique presently extensively studied and used, and is not repeatedly described here.

Step 402: determining whether the character recognition result matches the textual content corresponding to the voicing material, and going to Step 403 when the character recognition result matches the textual content, or going to Step 403' when the character recognition result does not match the textual content.

In this embodiment, after Step 401 of performing a character recognition on the authentication voice and obtaining the character recognition result, the electronic device may determine whether the character recognition result matches the textual content corresponding to the voicing material.

In some optional implementations of this embodiment, the electronic device may determine, in the event that the character recognition result is identical to the textual content corresponding to the voicing material, that the character recognition result matches the textual content corresponding to the voicing material, and determine, in the event that the character recognition result is not identical to the textual content corresponding to the voicing material, that the character recognition result does not match the textual content corresponding to the voicing material.

In some optional implementations of this embodiment, the electronic device may first determine the number of characters of an identical part between the character recognition result and the textual content corresponding to the voicing material as the number of characters of the identical part, then determine the total number of characters of the textual content corresponding to the voicing material, then calculate a ratio of the number of characters of the identical part to the total number of characters, and determines that the character recognition result matches the textual content corresponding to the voicing material when the calculated ratio is greater than a preset ratio threshold (for example, 80%), or determines that the character recognition result does not match the textual content corresponding to the voicing material when the calculated ratio is not greater than the preset ratio threshold (for example, 80%).

Step 403': determining a failure in authenticating the user and performing the first preset operation.

In this embodiment, the electronic device may determine, in Step 402, a failure in authenticating the user in the case of determining, in Step 401, that the recognized character recognition result mismatches the textual content corresponding to the voicing material, and perform the first preset operation.

In some optional implementations of this embodiment, the first preset operation may be sending new voicing material different from the current voicing material to the user terminal, so that the user reads again the textual content in the new voicing material, receives again authentication voice sent by the user terminal, and performs again Step 401 and Step 402 on the received authentication voice until a specified number of authentications (e.g. three times) is reached.

In some optional implementations of this embodiment, the first preset operation may be sending, to the terminal, a prompt message indicating the user to read again the textual content in the current voicing material, so that the user reads again the textual content in the current voicing material, receives again the authentication voice sent by the user terminal, and performs again Step 401 and Step 402 on the received authentication voice until a specified number of authentications (e.g. three times) is reached.

Step 403: performing a voiceprint characteristic extraction on the authentication voice to generate an authentication voiceprint.

In this embodiment, the electronic device may perform a voiceprint characteristic extraction on the authentication voice to generate an authentication voiceprint in the case of determining, in Step 402, that the character recognition result recognized in Step 401 matches the textual content corresponding to the voicing material.

It is to be noted that performing a voiceprint characteristic extraction on the authentication voice is a conventional technique presently extensively studied and used, and is not repeatedly described here. Those skilled in the art may appreciate that how to perform a voiceprint characteristic extraction on the authentication voice in the voiceprint authentication stage is related to the characteristic extraction process of a registered voiceprint in the voiceprint registration stage.

Step 404: determining whether the authentication voiceprint matches the preset blacklist voiceprint, and going to Step 405 when the authentication voiceprint does not match the preset blacklist voiceprint, or going to Step 405' when the authentication voiceprint matches the preset blacklist voiceprint.

In this embodiment, after Step 403 of performing a voiceprint characteristic extraction on the authentication voice to obtain the authentication voiceprint, the electronic device may determine whether the authentication voiceprint matches the preset blacklist voiceprint, and go to Step 405 to continue subsequent authentication steps when the authentication voiceprint does not match the preset blacklist voiceprint, or go to Step 405' to determine a failure in authenticating the user and perform the preset safety protection operation when the authentication voiceprint matches the preset blacklist voiceprint.

In some optional implementations of this embodiment, the preset blacklist voiceprint may be locally stored in the electronic device, or stored in other electronic devices (for example, a blacklist voiceprint server for storing the blacklist voiceprint) connected to the electronic device through a network, so that the electronic device may first acquire locally or remotely the preset blacklist voiceprint, and then determine whether the authentication voiceprint matches the preset blacklist voiceprint.

In some optional implementations of this embodiment, the electronic device may determine whether the authentication voice matches the preset blacklist voiceprint according to the following steps: first, the electronic device calculates a similarity between the authentication voiceprint and the preset blacklist voiceprint, then determines whether the calculated similarity is greater than a preset blacklist similarity threshold, and determines that the authentication voiceprint matches the preset blacklist voiceprint when the similarity is greater than the preset blacklist similarity threshold, or determines that the authentication voiceprint does not match the preset blacklist voiceprint when the similarity is not greater than the preset blacklist similarity threshold.

In some optional implementations of this embodiment, the electronic device may calculate the similarity between the authentication voiceprint and the preset blacklist voiceprint using distance measurement.

In some optional implementations of this embodiment, the electronic device also may calculate the similarity between the authentication voiceprint and the preset blacklist voiceprint using similarity measurement.

It is to be noted that the method for calculating the similarity using the distance measurement and the similarity measurement is a conventional technique presently extensively studied and used, and is not repeatedly described here.

Step 405': determining a failure in authenticating the user and performing a preset safety protection operation.

In this embodiment, the electronic device may determine a failure in authenticating the user in the case of determining, in Step 404, that the authentication voiceprint matches the preset blacklist voiceprint, and perform the preset safety protection operation. In this way, the protection operation may be performed timely to protect the safety of personal information and assets of the user in the event that the authentication voiceprint of the user is close to the preset blacklist voiceprint.

In some optional implementations of this embodiment, the preset safety protection operation may comprise at least one of: dialing a telephone number corresponding to the user identification, sending an SMS message to a mobile telephone number corresponding to the user identification, sending an email to a registered email account corresponding to the user identification, and forbidding accessing an account corresponding to the user identification within first preset time.

Step 405: searching a user voiceprint corresponding to the user identification in a preset user voiceprint set.

In this embodiment, the electronic device may search a user voiceprint corresponding to the user identification in the preset user voiceprint set in the case of determining, in Step 404, that the authentication voiceprint does not match the preset blacklist voiceprint.

Step 406: calculating a similarity between the authentication voiceprint and the user voiceprint.

In this embodiment, after searching out the user voiceprint corresponding to the user identification in Step 405, the electronic device may calculate the similarity between the authentication voiceprint and the user voiceprint.

In some optional implementations of this embodiment, the electronic device may calculate the similarity between the authentication voiceprint and the user voiceprint using distance measurement.

In some optional implementations of this embodiment, the electronic device may also calculate the similarity between the authentication voiceprint and the user voiceprint using similarity measurement.

It is to be noted that the method for calculating the similarity using the distance measurement and the similarity measurement is a conventional technique presently extensively studied and used, and is not repeatedly described here.

Step 407: determining whether the similarity is greater than a preset authentication threshold.

In this embodiment, after calculating the similarity between the authentication voiceprint and the user voiceprint in Step 406, the electronic device may determine whether the similarity is greater than the preset authentication threshold, and go to Step 408 when the similarity is greater than the preset authentication threshold, or go to Step 408' when the similarity is not greater than the preset authentication threshold.

Step 408': determining a failure in authenticating the user and performing a second preset operation.

In this embodiment, the electronic device may determine a failure in authenticating the user in the case of determining, in Step 407, that the similarity between the authentication voiceprint calculated in Step 406 and the user voiceprint is not greater than the preset authentication threshold, and perform the second preset operation.

For example, a failure in authenticating the user is determined and the second preset operation is performed when the similarity between the authentication voiceprint calculated in Step 406 and the user voiceprint is 0.75 but the preset authentication threshold is 0.85.

In some optional implementations of this embodiment, the second preset operation may be the same as the first preset operation.

In some optional implementations of this embodiment, the second preset operation also may be different from the first preset operation. For example, the second preset operation may comprise at least one of: forbidding accessing the user voiceprint corresponding to the user identification in the preset user voiceprint set within second preset time, and sending, to the user terminal, information for prompting the user to finish authenticating through customer service or other means.

Step 408: determining a success in authenticating the user and performing the user operation.

In this embodiment, the electronic device may determine a success in authenticating the user in the case of determining, in Step 407, that the similarity between the authentication voiceprint calculated in Step 406 and the user voiceprint is greater than the preset authentication threshold, and perform the user operation.

For example, a success in authenticating the user is determined and the user operation is performed when the similarity between the authentication voiceprint calculated in Step 406 and the user voiceprint is 0.95 but the preset authentication threshold is 0.85.

Step 409: determining whether the similarity is greater than a preset updated threshold, and going to Step 410 when the similarity is greater than the preset updated threshold.

In this embodiment, after determining a success in authenticating the user and performing the user operation, the electronic device may determine whether the similarity calculated in Step 406 is greater than the preset updated threshold, where the preset updated threshold is greater than the preset authentication threshold. For example, it is determined that the similarity is greater than the preset updated threshold when the preset authentication threshold is 0.85, the preset updated threshold is 0.90, and the similarity calculated in Step 406 is 0.95.

Step 410: updating, with the authentication voiceprint, the user voiceprint corresponding to the user identification in a preset user voiceprint set.

In this embodiment, the electronic device may update, with the authentication voiceprint, the user voiceprint corresponding to the user identification in the preset user voiceprint set in the case of determining, in Step 409, that the similarity is greater than the preset updated threshold.

In some optional implementations of this embodiment, the electronic device may directly use the authentication voiceprint as the user voiceprint corresponding to the user identification in the preset user voiceprint set.

In some optional implementations of this embodiment, the electronic device also may perform clustering operation on the authentication voiceprint and the user voiceprint searched in Step 405, and use the voiceprint obtained by clustering as the user voiceprint corresponding to the user identification in the preset user voiceprint set.

By means of the above updating operation, the user voiceprint corresponding to the user identification in the preset user voiceprint set may adapt to the change of the voiceprint of the user at any time, so that even though an illegal user obtains an old voiceprint of the user, the illegal user is unable to use the old voiceprint to succeed in authenticating after the user voiceprint corresponding to the user identification in the preset user voiceprint set is updated, thereby enhancing the safety of voiceprint authentication.

As can be seen from FIG. 4, compared with the embodiment corresponding to FIG. 2, steps of performing voice recognition on the authentication voice, matching the authentication voiceprint with the preset blacklist voiceprint, and updating the user voiceprint corresponding to the user identification in the preset user voiceprint set are additionally added in the flowchart 400 of the method for authenticating a user according to this embodiment. As thus, according to the solution described in this embodiment, a failure in authenticating the user may be determined in the event that the character recognition result of the authentication voiceprint is incorrect. The authentication voiceprint is matched with the user voiceprint corresponding to the user identification in the preset user voiceprint set in the event that the character recognition result of the authentication voiceprint is correct and the authentication voiceprint does not match the preset blacklist voiceprint, thereby reducing the amount of calculation for performing voiceprint matching and enhancing efficiency of the server. A failure in authenticating the user is determined in the event that the character recognition result of the authentication voiceprint is correct and the authentication voiceprint matches the preset blacklist voiceprint, and the preset safety protection operation is performed, so that safety of personal information and assets of the user is guaranteed to a greater degree. In addition, a difficulty of an illegal user stealing the voiceprint of the user for voiceprint authentication may be effectively increased by timely updating the user voiceprint corresponding to the user identification in the preset user voiceprint set.

Figure 5:
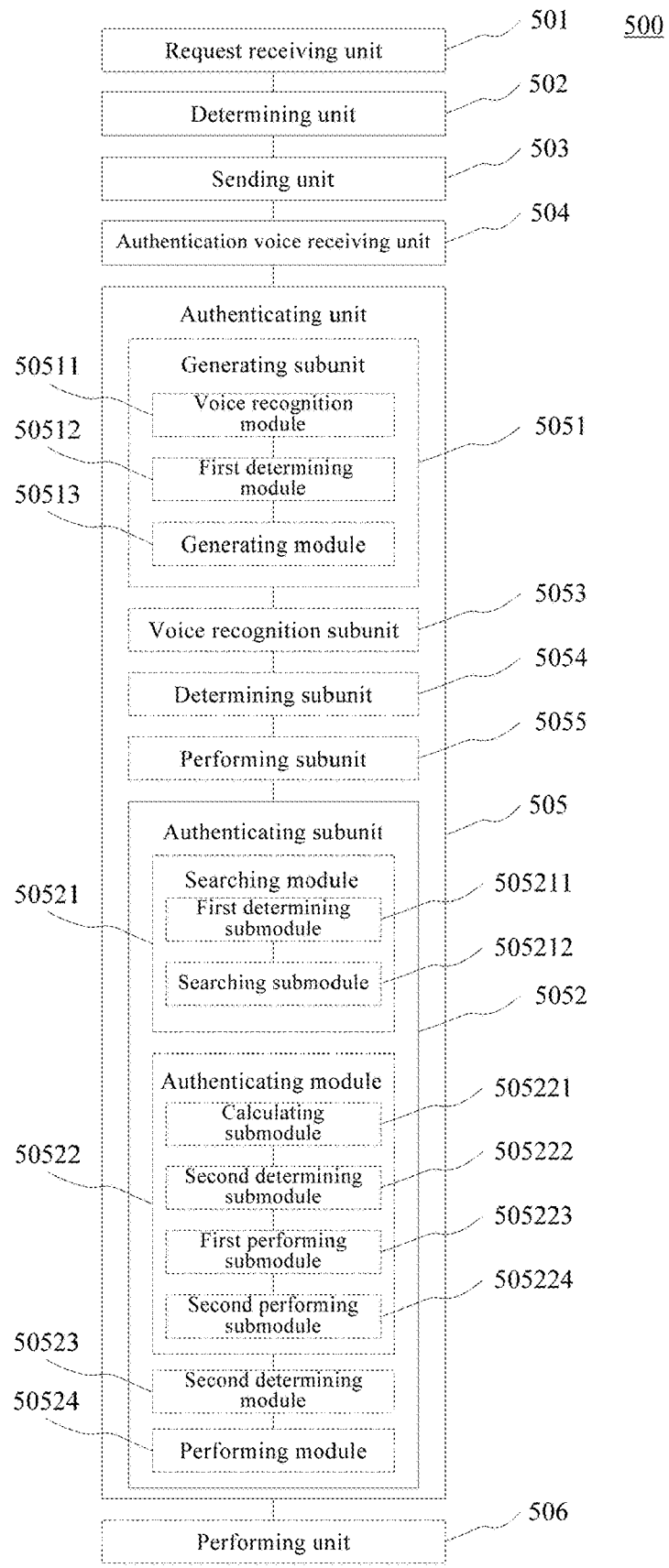
FIG. 5 is a schematic structural diagram of an apparatus for authenticating a user according to an embodiment of the present disclosure.

Further referring to FIG. 5, as an implementation of the method as shown in the foregoing figures, the present disclosure provides an embodiment of an apparatus for authenticating a user. The apparatus embodiment corresponds to the method embodiment as shown in FIG. 2, and the apparatus specifically may be used in various electronic devices.

As shown in FIG. 5, the apparatus 500 for authenticating a user in this embodiment comprises: a request receiving unit 501, a determining unit 502, a sending unit 503, an authentication voice receiving unit 504 and an authenticating unit 505. The request receiving unit 501 is configured to receive an authentication request sent by a user terminal. The authentication request comprises a user identification of a user of the user terminal and operation information related to user operation. The determining unit 502 is configured to determine whether the user operation matches a preset to-be-authenticated operation according to the user identification and the operation information. The sending unit 503 is configured to send voicing material to the user terminal for reading by the user in response to the determining unit determining that the user operation matches the preset to-be-authenticated operation, so that the user terminal acquires corresponding authentication voice of the user. The authentication voice receiving unit 504 is configured to receive the authentication voice sent by the user terminal. The authenticating unit 505 is configured to authenticate the user according to the user identification and the authentication voice.

In this embodiment, concrete treatments of the request receiving unit 501, the determining unit 502, the sending unit 503, the authentication voice receiving unit 504 and the authenticating unit 505 of the apparatus 500 for authenticating a user may respectively refer to related description of Step 201, Step 202, Step 203, Step 204 and Step 205 in corresponding embodiments in FIG. 2, which is not repeated described here.

In some optional implementations of this embodiment, the authenticating unit 505 may comprise: a generating subunit 5051, configured to perform a voiceprint characteristic extraction on the authentication voice to generate an authentication voiceprint; and an authenticating subunit 5052, configured to authenticate the user according to the user identification and the authentication voiceprint.

In some optional implementations of this embodiment, the generating subunit 5051 may comprise: a voice recognition module 50511, configured to perform a character recognition on the authentication voice to obtain a character recognition result; a first determining module 50512, configured to determine whether the character recognition result matches a textual content corresponding to the voicing material; and a generating module 50513, configured to perform a voiceprint characteristic extraction on the authentication voice to generate an authentication voiceprint in response to the first determining module determining that the character recognition result matches a textual content corresponding to the voicing material.

In some optional implementations of this embodiment, the authenticating unit 505 may further comprise: a voice recognition subunit 5053, configured to perform a character recognition on the authentication voice to obtain a character recognition result; a determining subunit 5054, configured to determine whether the character recognition result matches a textual content corresponding to the voicing material; and a performing subunit 5055, configured to determine a failure in authenticating the user in response to the determining subunit determining that the character recognition result mismatches the textual content corresponding to the voicing material, and perform a first preset operation.

In some optional implementations of this embodiment, the authenticating subunit 5052 may comprise: a searching module 50521, configured to search a user voiceprint corresponding to the user identification in a preset user voiceprint set; and an authenticating module 50522, configured to authenticate the user according to the user voiceprint and the authentication voiceprint.

In some optional implementations of this embodiment, the searching module 50521 may comprise: a first determining submodule 505211, configured to determine whether the authentication voiceprint matches a preset blacklist voiceprint; and a searching submodule 505212, configured to search a user voiceprint corresponding to the user identification in the preset user voiceprint set in response to the first determining submodule determining that the authentication voiceprint does not match the preset blacklist voiceprint.

In some optional implementations of this embodiment, the authenticating subunit 5052 may further comprise: a second determining module 50523, configured to determine whether the authentication voiceprint matches a preset blacklist voiceprint; and a performing module 50524, configured to determine a failure in authenticating the user in response to the second determining module determining that the authentication voiceprint matches the preset blacklist voiceprint, and perform a preset safety protection operation.

In some optional implementations of this embodiment, the authenticating module 50522 may comprise: a calculating submodule 505221, configured to calculate a similarity between the authentication voiceprint and the user voiceprint; a second determining submodule 505222, configured to determine whether the similarity is greater than a preset authentication threshold; and a first performing submodule 505223, configured to determine a success in authenticating the user in response to the second determining submodule determining that the similarity is greater than the preset authentication threshold, and perform the user operation.

In some optional implementations of this embodiment, the authenticating module 50522 may further comprise: a second performing submodule 505224, configured to determine a failure in authenticating the user in response to the second determining submodule determining that the similarity is not greater than the preset authentication threshold, and perform a second preset operation.

In some optional implementations of this embodiment, the first performing submodule 505223 is further configured to: determine whether the similarity is greater than a preset updated threshold, the preset updated threshold being greater than the preset authentication threshold; and update, with the authentication voiceprint, a user voiceprint corresponding to the user identification in the preset user voiceprint set in response to determining that the similarity is greater than the preset updated threshold.

In some optional implementations of this embodiment, the apparatus 500 may further comprise: a performing unit 506, configured to perform the user operation in response to the determining unit determining that the user operation does not match the preset to-be-authenticated operation.

In some optional implementations of this embodiment, the voicing material may comprise at least one of followings: text information, sound information and image information.

Figure 6:
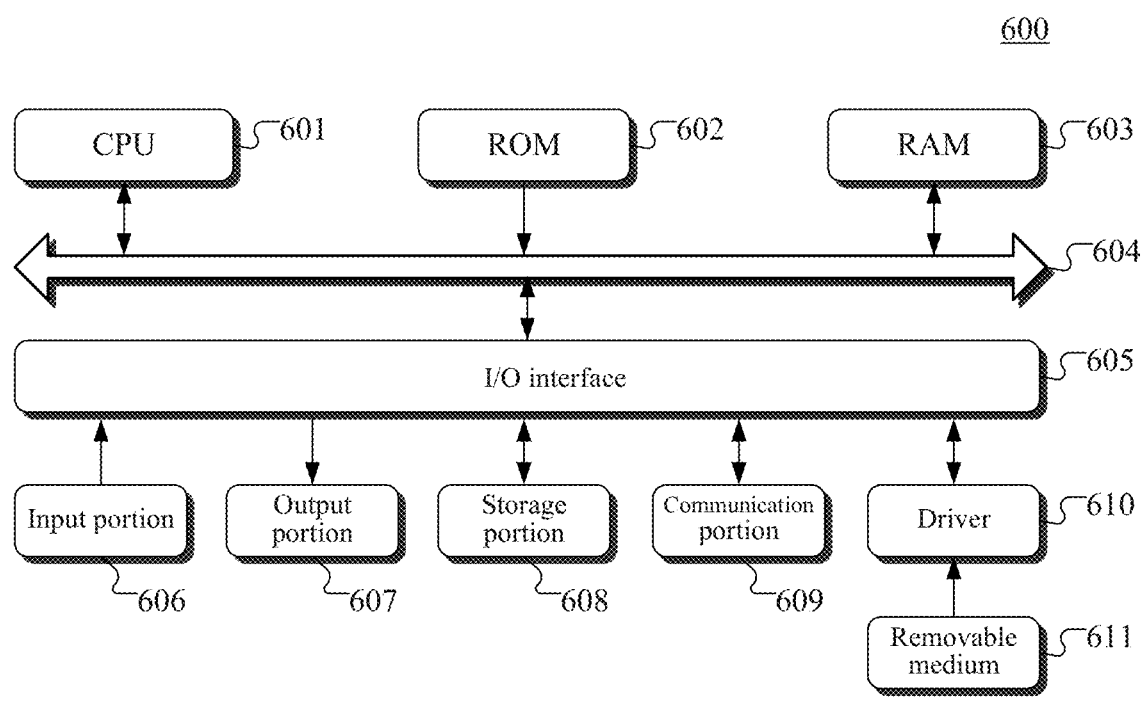
FIG. 6 illustrates a structural schematic diagram of a computer system adapted to implement a server of the embodiments of the present disclosure.

Referring to FIG. 6, a schematic structural diagram of a computer system 600 adapted to implement a server of the embodiments of the present disclosure is shown.

As shown in FIG. 6, the computer system 600 comprises a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 comprising a keyboard, a mouse etc.; an output portion 607 comprising a cathode ray tube (CRT), a liquid crystal display device (LCD), a speaker etc.; a storage portion 608 comprising a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure comprises a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present disclosure may be implemented by way of software or hardware. The described units or modules may also be provided in a processor, for example, described as: a processor, comprising a request receiving unit, a determining unit, a sending unit, an authentication voice receiving unit and an authenticating unit, where the names of these units or modules are not considered as a limitation to the units or modules. For example, the sending unit may also be described as "a unit for sending voicing material."

In another aspect, the present disclosure further provides a non-volatile computer storage medium. The non-volatile computer storage medium may be the non-volatile computer storage medium comprised in the apparatus in the above embodiments, or a stand-alone non-volatile computer storage medium which has not been assembled into the apparatus. The non-volatile computer storage medium stores one or more programs. The one or more programs, when executed by a device, cause the device to: receive an authentication request sent by a user terminal, wherein the authentication request comprises a user identification of a user of the user terminal and operation information related to user operation; determine whether the user operation matches a preset to-be-authenticated operation according to the user identification and the operation information; send voicing material to the user terminal for reading by the user in response to determining that the user operation matches the preset to-be-authenticated operation, so that the user terminal acquires corresponding authentication voice of the user; receive the authentication voice sent by the user terminal; and authenticate the user according to the user identification and the authentication voice.

The foregoing is only a description of the preferred embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. A method for authenticating a user, comprising:
receiving an authentication request sent by a user terminal, the authentication request comprising a user identification of a user of the user terminal and operation information related to user operation, the operation information related to user operation comprising at least one of: time information related to the user operation, site information related to the user operation, operation type information related to the user operation, operation object information related to the user operation, or operation numerical information related to the user operation;
determining whether the user operation matches a preset to-be-authenticated operation according to the user identification and the operation information, the preset to-be-authenticated operation comprising at least one of: a preset forbidden operation time range, a preset forbidden operation site range, a preset forbidden operation type, or a forbidden operation numerical range corresponding to the preset forbidden operation type;
sending voicing material to the user terminal for reading by the user in response to determining that the user operation matches the preset to-be-authenticated operation, so that the user terminal acquires corresponding authentication voice of the user;
receiving the authentication voice sent by the user terminal; and
authenticating the user according to the user identification and the authentication voice.

2. The method according to claim 1, wherein the authenticating the user according to the user identification and the authentication voice comprises:
performing a voiceprint characteristic extraction on the authentication voice to generate an authentication voiceprint; and
authenticating the user according to the user identification and the authentication voiceprint.

3. The method according to claim 2, wherein the performing a voiceprint characteristic extraction on the authentication voice to generate an authentication voiceprint comprises:
performing a character recognition on the authentication voice to obtain a character recognition result;
determining whether the character recognition result matches a textual content corresponding to the voicing material; and
performing a voiceprint characteristic extraction on the authentication voice to generate an authentication voiceprint in response to determining that the character recognition result matches a textual content corresponding to the voicing material.

4. The method according to claim 1, wherein the authenticating the user according to the user identification and the authentication voice further comprises:
performing a character recognition on the authentication voice to obtain a character recognition result;
determining whether the character recognition result matches a textual content corresponding to the voicing material; and
determining a failure in authenticating the user in response to determining that the character recognition result mismatches the textual content corresponding to the voicing material, and performing a first preset operation.

5. The method according to claim 2, wherein the authenticating the user according to the user identification and the authentication voice comprises:
searching a user voiceprint corresponding to the user identification in a preset user voiceprint set; and
authenticating the user according to the user voiceprint and the authentication voiceprint.

6. The method according to claim 5, wherein the searching a user voiceprint corresponding to the user identification in a preset user voiceprint set comprises:
determining whether the authentication voiceprint matches a preset blacklist voiceprint; and
searching a user voiceprint corresponding to the user identification in the preset user voiceprint set in response to determining that the authentication voiceprint does not match the preset blacklist voiceprint.

7. The method according to claim 2, wherein the authenticating the user according to the user identification and the authentication voice comprises:
determining whether the authentication voiceprint matches a preset blacklist voiceprint; and
determining a failure in authenticating the user in response to determining that the authentication voiceprint matches the preset blacklist voiceprint, and performing a preset safety protection operation.

8. The method according to claim 5, wherein the authenticating the user according to the user voiceprint and the authentication voiceprint comprises:
calculating a similarity between the authentication voiceprint and the user voiceprint;
determining whether the similarity is greater than a preset authentication threshold; and determining a success in authenticating the user in response to determining that the similarity is greater than the preset authentication threshold, and performing the user operation.

9. The method according to claim 8, wherein the authenticating the user according to the user voiceprint and the authentication voice further comprises:
determining a failure in authenticating the user in response to determining that the similarity is not greater than the preset authentication threshold, and performing a second preset operation.

10. The method according to claim 8, wherein the determining a success in authenticating the user in response to determining that the similarity is greater than the preset authentication threshold, and performing the user operation comprises:
determining whether the similarity is greater than a preset updated threshold, the preset updated threshold being greater than the preset authentication threshold; and
updating, with the authentication voiceprint, a user voiceprint corresponding to the user identification in the preset user voiceprint set in response to determining that the similarity is greater than the preset updated threshold.

11. The method according to claim 1, further comprising:
performing the user operation in response to determining that the user operation does not match the preset to-be-authenticated operation.

12. The method according to claim 1, wherein the voicing material comprises at least one of: text information, sound information or image information.

13. An apparatus for authenticating a user, comprising:
at least one processor; and
a memory storing instructions, wherein the instructions, when executed by the at least one processor, cause the at least one processor to perform operations, the operations comprising:
receiving an authentication request sent by a user terminal, the authentication request comprising a user identification of a user of the user terminal and operation information related to user operation, the operation information related to user operation comprising at least one of: time information related to the user operation, site information related to the user operation, operation type information related to the user operation, operation object information related to the user operation, or operation numerical information related to the user operation;
determining whether the user operation matches a preset to-be-authenticated operation according to the user identification and the operation information, the preset to-be-authenticated operation comprising at least one of: a preset forbidden operation time range, a preset forbidden operation site range, a preset forbidden operation type, or a forbidden operation numerical range corresponding to the preset forbidden operation type;
sending voicing material to the user terminal for reading by the user in response to determining that the user operation matches the preset to-be-authenticated operation, so that the user terminal acquires corresponding authentication voice of the user;
receiving the authentication voice sent by the user terminal; and
authenticating the user according to the user identification and the authentication voice.

14. The apparatus according to claim 13, wherein the authenticating the user according to the user identification and the authentication voice comprises:
performing a voiceprint characteristic extraction on the authentication voice to generate an authentication voiceprint; and
authenticating the user according to the user identification and the authentication voiceprint.

15. The apparatus according to claim 14, wherein the performing a voiceprint characteristic extraction on the authentication voice to generate an authentication voiceprint comprises:
performing a character recognition on the authentication voice to obtain a character recognition result;
determining whether the character recognition result matches a textual content corresponding to the voicing material; and
performing a voiceprint characteristic extraction on the authentication voice to generate an authentication voiceprint in response to the first determining module determining that the character recognition result matches a textual content corresponding to the voicing material.

16. The apparatus according to claim 13, wherein the authenticating the user according to the user identification and the authentication voice further comprises:
performing a character recognition on the authentication voice to obtain a character recognition result;
determining whether the character recognition result matches a textual content corresponding to the voicing material; and
determining a failure in authenticating the user in response to the determining subunit determining that the character recognition result mismatches the textual content corresponding to the voicing material, and perform a first preset operation.

17. The apparatus according to claim 14, wherein the authenticating the user according to the user identification and the authentication voice comprises:
searching a user voiceprint corresponding to the user identification in a preset user voiceprint set; and
authenticating the user according to the user voiceprint and the authentication voiceprint.

18. The apparatus according to claim 17, wherein the searching a user voiceprint corresponding to the user identification in a preset user voiceprint set comprises:
determining whether the authentication voiceprint matches a preset blacklist voiceprint; and
searching a user voiceprint corresponding to the user identification in the preset user voiceprint set in response to the first determining submodule determining that the authentication voiceprint does not match the preset blacklist voiceprint.

19. The apparatus according to claim 14, wherein the authenticating the user according to the user identification and the authentication voice comprises:
determining whether the authentication voiceprint matches a preset blacklist voiceprint; and
determining a failure in authenticating the user in response to the second determining module determining that the authentication voiceprint matches the preset blacklist voiceprint, and perform a preset safety protection operation.

20. The apparatus according to claim 17, wherein the authenticating the user according to the user voiceprint and the authentication voiceprint comprises:

calculating a similarity between the authentication voiceprint and the user voiceprint;
determining whether the similarity is greater than a preset authentication threshold; and
determining a success in authenticating the user in response to the second determining submodule determining that the similarity is greater than the preset authentication threshold, and perform the user operation.

21. The apparatus according to claim 20, wherein the authenticating the user according to the user voiceprint and the authentication voice further comprises:
determining a failure in authenticating the user in response to the second determining submodule determining that the similarity is not greater than the preset authentication threshold, and perform a second preset operation.

22. The apparatus according to claim 20, wherein the determining a success in authenticating the user in response to determining that the similarity is greater than the preset authentication threshold, and performing the user operation comprises:
determining whether the similarity is greater than a preset updated threshold, the preset updated threshold being greater than the preset authentication threshold; and
updating, with the authentication voiceprint, a user voiceprint corresponding to the user identification in the preset user voiceprint set in response to determining that the similarity is greater than the preset updated threshold.

23. The apparatus according to claim 13, wherein the operations further comprise:
performing the user operation in response to the determining unit determining that the user operation does not match the preset to-be-authenticated operation.

24. The apparatus according to claim 13, wherein the voicing material comprises at least one of followings: text information, sound information or image information.

25. A non-transitory computer storage medium storing a computer program, wherein the computer program, when executed by one or more processors, causes the one or more processors to perform operations, the operations comprising:
receiving an authentication request sent by a user terminal, the authentication request comprising a user identification of a user of the user terminal and operation information related to user operation, the operation information related to user operation comprising at least one of: time information related to the user operation, site information related to the user operation, operation type information related to the user operation, operation object information related to the user operation, or operation numerical information related to the user operation;
determining whether the user operation matches a preset to-be-authenticated operation according to the user identification and the operation information, the preset to-be-authenticated operation comprising at least one of: a preset forbidden operation time range, a preset forbidden operation site range, a preset forbidden operation type, or a forbidden operation numerical range corresponding to the preset forbidden operation type;
sending voicing material to the user terminal for reading by the user in response to determining that the user operation matches the preset to-be-authenticated operation, so that the user terminal acquires corresponding authentication voice of the user;
receiving the authentication voice sent by the user terminal; and
authenticating the user according to the user identification and the authentication voice.

* * * * *